A. CHURCHWARD.
ELECTRIC WELDING METHOD AND APPARATUS.
APPLICATION FILED FEB. 18, 1920.
1,355,124.
Patented Oct. 12, 1920.
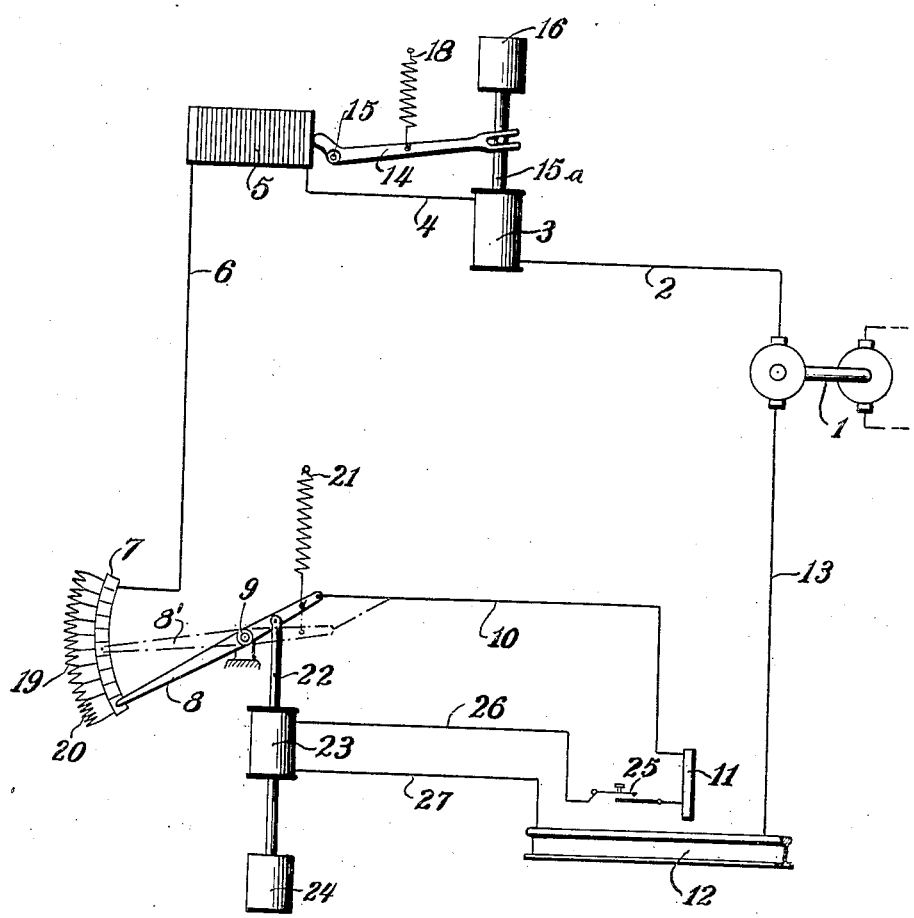
Inventor
Alexander Churchward
By his Attorneys
Williams & Pritchard

UNITED STATES PATENT OFFICE.

ALEXANDER CHURCHWARD, OF NEW YORK, N. Y., ASSIGNOR TO WILSON WELDER & METALS COMPANY, INC, A CORPORATION OF NEW YORK.

ELECTRIC-WELDING METHOD AND APPARATUS.

1,355,124.     Specification of Letters Patent.     Patented Oct. 12, 1920.

Application filed February 18, 1920. Serial No. 359,496.

*To all whom it may concern:*

Be it known that I, ALEXANDER CHURCHWARD, a citizen of the United States, residing at New York city, county of New York, State of New York, have invented certain new and useful Improvements in Electric-Welding Methods and Apparatus, of which the following is a specification.

My invention relates to electric arc welding and particularly to that type of welding where the metal is transferred across an arc from a metallic electrode. One object of my invention is to produce an improved system of current control so arranged that compensation will be automatically made for the rapid fluctuations in the arc with the minimum amount of time lag. Attempts have been made hitherto to maintain a uniform flow of current through an arc by employing compensating means operated by solenoids in series or in shunt with the arc itself. Among the compensating systems hitherto suggested may be mentioned the system employing a "step-by-step" operated compensating resistance. In the operation of this system, the different steps of the resistance were thrown into the circuit successively as the strength of the current gradually increased. This system was capable only of maintaining an approximately constant average current in the welding circuit, but was entirely incapable of compensating for rapid momentary fluctuations.

Recent researches have proven that, during metallic arc welding, small particles of metal are projected from the end of the electrode to the work with great rapidity and at exceedingly small intervals of time. Consequently fluctuations occur in the arc causing the strength of the current to be extremely variable. Generally the fluctuations occur at the rate of from thirty to fifty times a second, but often occur at a more rapid rate. In attempting to maintain an even flow of current, it will be evident that a coarse step-by-step resistance is responsive only to gradual "long swing" changes and is entirely inadequate for compensating for the above mentioned rapid variations which actually occur in the circuit.

It has also been proposed to maintain a constant current through the arc by a pressure-controlled, smoothly variable carbon-pile resistance responsive to variations in the arc circuit. Devices of this nature, in order to have a sufficient range of compensation, must necessarily be constructed of parts having a considerable amount of inertia. These devices were not only smoothly acting, but were comparatively rapid and constituted a big advance over the former step-by-step current control system. They were, however, subject to a small time lag owing to the large size of the levers, springs and solenoids necessarily employed.

According to the principles of my invention, I am able to produce a welding system wherein the action of the current compensating means will be still more in synchronism with the extremely rapid fluctuations of the arc and I achieve this result by combining a "step-by-step" graduated resistance having a wide range, with a small, quick acting, smoothly variable carbon-pile resistance of low inertia and inductance. The quick acting carbon-pile acts as a "micrometer adjustment" and will be hereinafter referred to as the "micrometer resistance."

In the accompanying drawing, one embodiment of my invention has been disclosed by way of illustration, and will now be described in detail. The welding circuit shown is supplied with current from the generator 1 and comprises the wire 2, series solenoid 3, wire 4, micrometer adjustment 5, wire 6, step-by-step resistance 7, lever 8 pivoted at the point 9, wire 10, electrode 11, work 12, and wire 13. The micrometer resistance 5 comprises a pile having a series of carbon resister blocks, the resistance of the pile being responsive to the pressure exerted thereon by the small lever 14 of low inertia pivoted at 15. In order to automatically control the pressure exerted by the lever 14, in accordance with the variations in the current flowing through the arc, I provide a core 15ª located within the series solenoid 3, of small inductance. The solenoid 3 is also connected to the lever 14. Upon the upper part of the core 15ª is provided the dash-pot 16, to dampen somewhat the vibrations of the lever. The spring 18, located between the core and the fulcrum of the lever, produces a constant compressing action upon the lever, opposing the action of the core 15ª.

The coarse step-by-step graduated resistance 7, is shown as consisting of a series of equally graduated steps 19 and a single step 20 having a considerably higher resistance than any of the other steps 19. This high resistance step 20 is provided in order to prevent an excessive current when the arc is initially "struck." The wiper of lever 8 controlling the step-by-step resistance is initially held in the lowermost position by the spring 21. Between the fulcrum 9 and the point of application of the spring 21, I provide a core 22 drawn downwardly by the solenoid 23 in shunt with the arc, and having at its lower end a dampening device, such as the dash-pot 24. The passage of current through the shunt solenoid may be controlled at will by a switch 25 located on the handle of the electrode.

Before starting to weld the electrode 11 is first brought into contact with the work 12, and the switch 25 is closed. No current will flow through the shunt circuit at this time since it is short circuited, and owing to the high resistance step 20, of the step-by-step controller, only a feeble current will flow through the main circuit.

When it is desired to commence welding, the arc is struck by separating the electrode 11 from the work 12. As will be evident, the current will then flow through the shunt circuit as follows; from the switch 25, wire 26, shunt solenoid 23 and wire 27. The action of the shunt solenoid 23 will be to oppose and overcome the spring 21 and to cause the contact end of the lever 8 to move upwardly from the high resistance 20, and contact successively with the equal steps 19. This action will continue until the lever 8 reaches a position where the pull of the solenoid 23 balances the pull of the spring 21.

While welding, the coarse step-by-step resistance will operate to compensate for the slow "long-swing," gradual, variations in the current caused for example when the arc length is increased, and the micrometer resistance will compensate for the rapid momentary fluctuations or "flickers" caused by the transfer of metal particles across the arc. The low inertia of the micrometer resistance allows the compensating means to readily follow the fluctuations in the arc with a minimum time lag and consequently the current control will be extremely close, and the metal deposited upon the work 12 will be of a very uniform nature. By the use of a small sensitive micrometer resistance in conjunction with a coarse compensating resistance, as described, I am enabled to control the current through the arc to within less than 2%, a result which would have been absolutely impossible hitherto.

I desire it to be understood that my invention may be practised in many other ways, and that it is not to be limited by the illustration herein disclosed.

I claim:

1. In an electric welding system, means to produce a constant current through the arc comprising a step-by-step graduated resistance, and a non-graduated smoothly variable resistance simultaneously responsive to variations in the arc current.

2. In an electric welding system, means to produce a constant current through the arc comprising a coarsely graduated variable resistance in combination with a micro-variable resistance both of said variable resistances being in series circuit with the arc current and simultaneously responsive to variations in the current strength.

3. In an electric welding system, means to produce a constant current through the arc, comprising two distinct co-acting variable resistances in series with the arc current and responsive thereto.

4. In an electric welding system, means to produce a constant current through the arc comprising two co-acting variable resistances in series with the arc and responsive to variations in the arc current, one of said variable resistances having a wide range and the other a small range.

5. In an electric welding system, means to produce a constant current through the arc comprising two variable resistances in series with the arc simultaneously acting to compensate for fluctuations in the resistance of the arc, one of said variable resistances being sensitive to minute fluctuations and the other to fluctuations of a higher order of magnitude.

6. Apparatus for electric arc welding comprising a source of current supply, a welding circuit, means to compensate for rapid fluctuations in the current strength and means to compensate for current fluctuations slowly responsive to the current fluctuations.

7. In an apparatus for electric arc welding, means to automatically compensate for fluctuations in the resistance of the arc to maintain a uniform flow of current through the circuit comprising a source of current supply, a welding circuit, means responsive to all micro-increments and decrements in the current strength co-acting with means respsonsive only to large fluctuations of said current strength.

8. In an apparatus for electric arc welding, means to automatically compensate for fluctuations in the resistance of the arc to maintain a uniform flow of current through the arc, comprising a source of current supply, a welding circuit, and a simultaneously co-acting micro-sensitive compensator and a comparatively insensitive compensator.

9. In an electric welding system, means to produce a constant flow of current through the arc comprising two co-acting independently operating compensating resistances in circuit with the arc and responsive to variations in the arc current, one of said resistances being substantially more sensitive than the other.

10. Apparatus for automatically compensating for variations in the current of an electric arc welding circuit comprising a pressure variable resistance smoothly controlled by a compressing lever operated by a solenoid, a coarsely variable resistance controlled by a shunt solenoid, and a switch located on the electrode handle for opening and closing the circuit through the shunt solenoid.

11. In an electric welding system, means to produce a constant flow of current through the circuit, comprising means to compensate for the small "flickers" in the arc current and means to absorb the large gradual "long swing" variations therein.

12. In an electric welding system, means to produce a constant flow of current through the circuit, comprising two compensators for the fluctuations in the arc resistance responsive to the variations in the welding current, one being sluggish, and the other being quick acting.

13. In an electric welding system, means for producing a uniform current through the arc comprising a micro-sensitive smoothly variable non-graduated compensating resistance acting in conjunction with a graduated resistance, said graduated resistance having a series of equal steps and one step of much higher resistance to provide a starting current of low intensity.

14. The method of electric arc welding which comprises supplying electrical energy to a welding circuit, automatically compensating for the large, gradual fluctuations of the current in the arc, and independently automatically compensating for the small, rapid fluctuations of said current.

15. The method of electric arc welding which comprises supplying electrical energy to a welding circuit, automatically compensating for large "long-swing" fluctuations of the current flowing through the arc, and simultaneously independently compensating for all "micro-variations" of said current.

In testimony whereof, I have affixed my signature to this specification.

ALEXANDER CHURCHWARD.